(12) United States Patent
Snapp

(10) Patent No.: US 8,095,122 B2
(45) Date of Patent: Jan. 10, 2012

(54) METHOD AND SYSTEM FOR ROUTING SPECIAL NUMBER CALLS USING A COMMON TELECOMMUNICATION NETWORK

(75) Inventor: John Lawrence Snapp, Westminster, CO (US)

(73) Assignee: West Corporation, Omaha, NE (US)

( * ) Notice: Subject to any disclaimer, the term of this patent is extended or adjusted under 35 U.S.C. 154(b) by 394 days.

(21) Appl. No.: 12/495,861

(22) Filed: Jul. 1, 2009

(65) Prior Publication Data

US 2011/0003575 A1 Jan. 6, 2011

(51) Int. Cl.
*H04M 3/42* (2006.01)
(52) U.S. Cl. .............. 455/417; 455/404.1; 455/414.1; 455/415; 455/445; 455/456.1
(58) Field of Classification Search .......... 455/417, 455/404.1, 414.1, 415, 445, 456.1
See application file for complete search history.

(56) References Cited

U.S. PATENT DOCUMENTS

| 7,383,045 | B2 | 6/2008 | Tamura et al. |
| 7,444,148 | B1 | 10/2008 | Cook |
| 2004/0203863 | A1* | 10/2004 | Huomo ............... 455/456.1 |

* cited by examiner

*Primary Examiner* — Nghi Ly

(57) ABSTRACT

A method for routing a special number call to an appropriate answering position using a common telecommunication network includes: (a) placing an extant special number call to a switching center; (b) ascertaining the appropriate answering position for receiving the extant call; (c) providing to a gateway switch call-information for routing the extant call to the appropriate answering position; (d) in no particular order: (1) associating the call-information with a temporary number; and (2) providing the temporary number to the switching center; (e) employing the temporary number as a called party number for routing the extant call through the network to the gateway switch; and (f) operating the gateway switch to employ the call-information associated with the temporary number for routing the extant call to the appropriate answering position.

20 Claims, 2 Drawing Sheets

METHOD AND SYSTEM FOR ROUTING SPECIAL NUMBER CALLS USING A COMMON TELECOMMUNICATION NETWORK

FIELD OF THE INVENTION

The present invention is directed to telecommunication systems, and especially to handling special number calls using communication networks and avoiding use of dedicated trunks.

BACKGROUND OF THE INVENTION

Special number services such as, by way of example and not by way of limitation the Emergency Service E9-1-1 network in the United States, generally involve routing special number calls via dedicated trunks. It would be advantageous to route special number calls using common telecommunication networks such as, by way of example and not by way of limitation, the Public Switched Telephone Network (PSTN) to avoid costs associated with installation and maintenance of dedicated trunks, so long as security of special number calls may be maintained.

There is a need for a system and method for routing special number calls using a common telecommunication network.

SUMMARY OF THE INVENTION

A method for routing a special number call to an appropriate answering position using a common telecommunication network, the special number call being received at a switching center coupled with said common telecommunication network, includes: (a) ascertaining the appropriate answering position for receiving the extant call; (b) providing to a gateway switch call-information for routing the extant call to the appropriate answering position; (c) in no particular order: (1) associating the call-information with a temporary number; and (2) providing the temporary number to the switching center; (d) employing the temporary number as a called party number for routing the extant call through the network to the gateway switch; and (e) operating the gateway switch to employ the call-information associated with the temporary number for routing the extant call to the appropriate answering position.

A system for routing a special number call to an appropriate special number answering position using a common telecommunication network, a switching center being coupled with said common telecommunication network and configured for receiving an extant said special number call, includes: (a) a routing determining unit coupled with the switching center for determining location of origin of the extant special number call; the routing determining unit ascertaining an appropriate special number answering position based on the location of origin of the extant special number call; and (b) a gateway switch unit coupled with the routing determining unit, coupled with the common telecommunication network and coupled with the appropriate special number answering position. The switching center conveys the extant the special number call to the routing determining unit. The routing determining unit provides call-related information to the gateway switch unit for routing the extant special number call to the appropriate special number answering position. The gateway switch unit identifies a temporary call number, associates the temporary call number with the call-related information and provides the temporary call number to the switching center via the routing determining unit. The switching center employs the temporary call number as a called party number for routing the extant special number call through the common telecommunication network to the gateway switch. The gateway switch employs the call-related information associated with the temporary call number for routing the extant special number call to the appropriate special number answering position. The gateway switch may configure the temporary call number for reuse for a subsequent special number call.

It is, therefore a feature of the present invention to provide a system and method for routing special number calls using a common telecommunication network.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
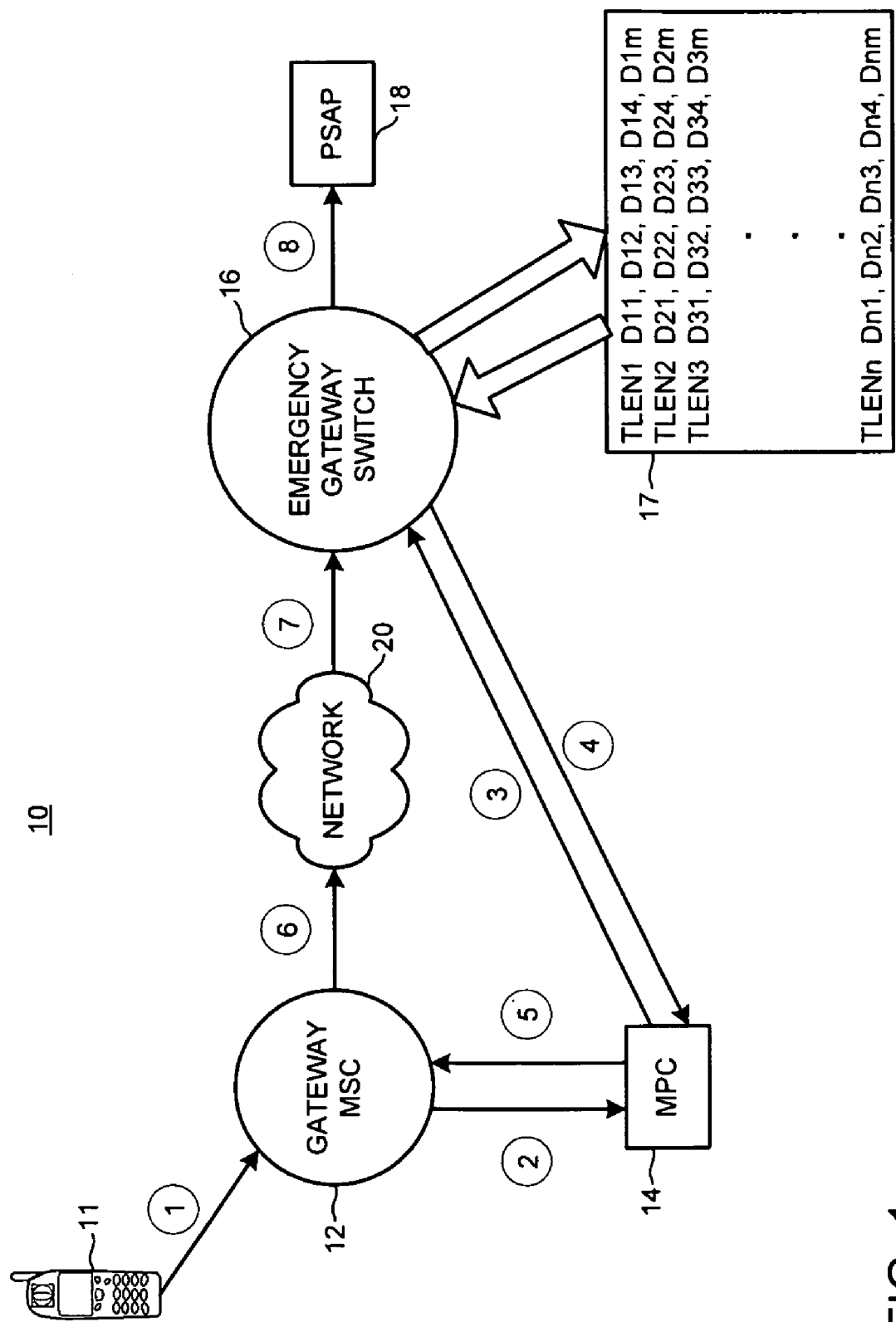
FIG. 1 is a schematic diagram illustrating a system for routing special number calls using a common telecommunication network.

FIG. 1 is a schematic diagram illustrating a system for routing special number calls using a common telecommunication network. In FIG. 1, a system 10 for routing a special number call such as, by way of example and not by way of limitation, an emergency service call, includes a switching center 12, a routing determining unit 14, a gateway switch unit 16 and an answering position 18. A common telecommunication network 20 is coupled with switching center 12 and with gateway switch unit 16.

When system 10 is configured for handling land line calls, switching center 12 and routing determining unit 14 may be combined into a single entity embodied in a Central Office (not shown in detail in FIG. 1; understood by those skilled in the art of telecommunication system design). Common telecommunication network 20 may be embodied in any telecommunication network that may be generally accessed by users in a shared manner as opposed to dedicated trunks configured for handling a special class or a limited number of special classes of calls. An example of such a dedicated trunk may be a dedicated emergency service trunk with associated emergency service tandems for routing calls to a Public Safety Answering Point (PSAP; sometimes referred to as a Public Safety Answering Position). An exemplary embodiment of common telecommunication network 20 is a Public Switched Telephone Network (PSTN).

When system 10 is configured for handling mobile calls, switching center 12 may be embodied in a Mobile Switching Center (MSC), and routing determining unit 14 may be embodied in a Mobile Positioning Center (MPC). Common telecommunication network 20 may be embodied in any telecommunication network that may be generally accessed by users in a shared manner, as opposed to dedicated trunks configured for handling a special class or a limited number of special classes of calls. An example of such a dedicated trunk may be a dedicated emergency service trunk with associated emergency service tandems for routing calls to a PSAP. An exemplary embodiment of common telecommunication network 20 is a PSTN.

Operation of system 10 will be described in the context of a wireless Emergency Services call (indicated as Call #1) placed to Gateway Mobile Switching Center 12 from a mobile phone unit 11. Mobile phone unit 11 may be embodied in an apparatus capable of placing mobile calls such as, by way of example and not by way of limitation, a mobile phone, cellular phone, "Smart" phone, Personal Digital Assistant (PDA), mobile radio devices or another wireless calling apparatus. A mobile call may include, by way of example and not by way of limitation, a call placed to a cellular tower, placed to a Wi-Fi base station, place by an Automated Crash Notification (ACN) unit, placed to another local base station or otherwise establishing a wireless link directly with Gateway MSC 12 or indirectly with Gateway MSC 12 via an intermediate call receiving unit (not shown in FIG. 1; understood by those skilled in the art of mobile telecommunication system design).

After receiving Emergency Services Call (Call #1), Gateway MSC 12 passes call information to MPC 14 (indicated as Call #2). MPC 14 ascertains locus of origin of the extant call. In the exemplary call situation illustrated in FIG. 1, MPC 14 ascertains location of mobile phone unit 11 using one or more location technology and determines an appropriate PSAP for serving that location such as, by way of example and not by way of limitation, cell tower localization, GPS (Global Positioning System) or another location technology or combination of location technologies.

MPC 14 sends a notification of having received an emergency service call to Emergency Gateway Switch 16 (indicated as Call #3). MSC 14 also provides call-related information to Emergency Gateway Switch 16 such as, by way of example and not by way of limitation, identity of the appropriate PSAP for receiving the extant emergency services call, called party number, calling party number, Generic Digits Parameter and other outbound call parameters. MPC 14 requests routing instructions and a Temporary Local Emergency Number (TLEN).

Emergency Gateway Switch 16 assigns a TLEN from a pool or storage unit 17. Storage unit 17 may store a plurality of TLENs, indicated in FIG. 1 as TLEN1, TLEN2, TLEN3, TLENn. The indicator "n" is employed to signify that there can be any number of Temporary Local Emergency Numbers (TLENs) stored in storage unit 17. The inclusion of four TLENs TLEN1, TLEN2, TLEN3, TLENn in FIG. 1 is illustrative only and does not constitute any limitation regarding the number of TLENs that may be stored in storage unit 17 within system 10 in configuring the present invention.

Emergency Gateway Switch 16 provides the assigned TLEN to MPC 14 (indicated as Call #4) and assigns routing data received from MPC 14 via call #3 in association with the assigned TLEN. Thus, TLENs may be associated with routing data in storage unit 17 so that TLEN1 may have routing data elements D11, D12, D13, D14, D1m associated in store 17. TLEN2 may have routing data elements D21, D22, D23, D14, D2m associated in store 17. TLEN3 may have routing data elements D31, D32, D33, D14, D3m associated in store 17. TLENn may have routing data elements Dn1, Dn2, Dn3, Dn4, D1m associated in store 17. The indicator "m" is employed to signify that there can be any number of data elements associated with a respective TLENn in storage unit or store 17. The inclusion of five data elements Dn1, Dn2, Dn3, Dn4, D1m in FIG. 1 is illustrative only and does not constitute any limitation regarding the number of data elements that may be associated with a respective TLENn in storage unit 17 within system 10 in configuring the present invention.

Throughout this description, use of a reference numeral using a generic subscript herein may be taken to mean that any respective member of the plurality of elements having the same reference numeral may be regarded as included in the description. Thus, by way of example and not by way of limitation, referring to TLENn in describing FIG. 1 may be taken to mean that any TLEN—TLEN1, TLEN2, TLEN3 or TLENn (FIG. 1)—may be regarded as capable of employment as described. Similarly, referring to Dnm in describing FIG. 1 may be taken to mean that any data element—Dn1, Dn2, Dn3, Dn4 or D1m (FIG. 1)—may be regarded as capable of employment as described.

MPC 14 provides the assigned TLEN (received via call #4) to Gateway MSC 12 (indicated as call #5). Gateway MSC 12 employs the assigned TLEN (received via call #5) as the called number for routing the extant call (received via call #1) via network 20 to Emergency Gateway Switch 16 (indicated as calls #6 and #7).

Preferably, Emergency Gateway Switch 16 assigns a limited time frame when issuing an assigned TLEN so that the assigned TLEN may only be employed for a predetermined interval. Also preferably, when Emergency Gateway Switch 16 receives a call identified by an extant assigned TLEN, the time interval associated with the extant assigned received TLEN is closed and no other calls may be received using the extant assigned TLEN. The extant assigned TLEN may thereafter be returned to storage unit 17 for reuse in connection with a later-placed emergency call.

When Emergency Gateway Switch 16 receives an emergency call identified with an extant assigned TLEN (indicated as call #7), after closing the time interval associated with the extant assigned TLEN, Emergency Gateway Switch 16 retrieves routing data Dnm from storage unit 17 that is associated with the extant assigned TLEN and uses that retrieved routing data for routing the extant call to PSAP 18 (indicated as call #8). Routing by Emergency Gateway Switch 16 to PSAP 18 may occur via a Selective Router or other system nodes (not shown in FIG. 1, known to those skilled in the art of telecommunication system design and mobile telecommunication system design).

Figure 2:
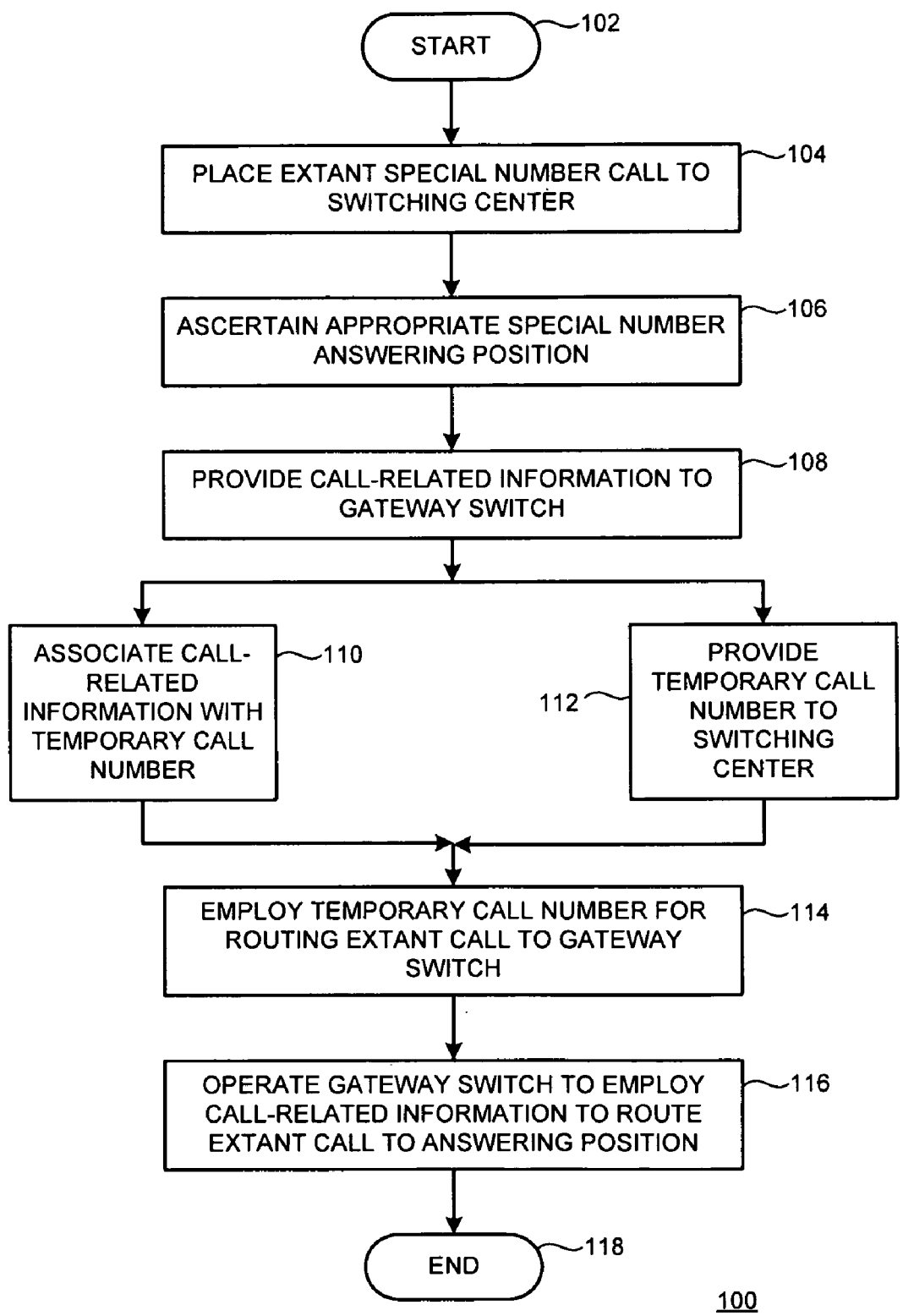
FIG. 2 is a flow diagram illustrating a method for routing special number calls using a common telecommunication network.

FIG. 2 is a flow diagram illustrating a method for routing special number calls using a common telecommunication network. In FIG. 2, a method 100 for routing a special number call to an appropriate special number answering position using a common telecommunication network begins at a START locus 102.

Method 100 continues with placing an extant special number call to a switching center, as indicated by a block 104. Method 100 continues with ascertaining the appropriate special number answering position for receiving the extant special number call, as indicated by a block 106.

Method 100 continues with providing to a gateway switch call-related information for routing the extant special number call to the appropriate special number answering position, as indicated by a block 108. Method 100 continues with, in no particular order: (1) associating the call-related information with a temporary call number at the gateway switch, as indicated by a block 110; and (2) providing the temporary call number to the switching center, as indicated by a block 112.

Method 100 continues with employing the temporary call number as a called party number for routing the extant special number call through the common telecommunication network to the gateway switch, as indicated by a block 114. Method 100 continues with operating the gateway switch to employ the call-related information associated with the temporary call number for routing the extant special number call to the appropriate special number answering position, as indicated by a block 116. Method 100 terminates at an END locus 118.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for routing a special number call to an appropriate special number answering position using a common telecommunication network; said special number call being received at a switching center coupled with said common telecommunication network; the method comprising:
   (a) ascertaining said appropriate special number answering position for receiving said extant special number call;
   (b) providing to a gateway switch call-related information for routing said extant special number call to said appropriate special number answering position;
   (c) in no particular order:
      (1) associating said call-related information with a temporary call number at said gateway switch; and
      (2) providing said temporary call number to said switching center;
   (d) employing said temporary call number as a called party number for routing said extant special number call through said common telecommunication network to said gateway switch; and
   (e) operating said gateway switch to employ said call-related information associated with said temporary call number for routing said extant special number call to said appropriate special number answering position.

2. The method for routing a special number call to an appropriate special number answering position using a common telecommunication network as recited in claim 1 wherein step (d) further includes, in no particular order, establishing a time interval during which said temporary call number can be employed.

3. The method for routing a special number call to an appropriate special number answering position using a common telecommunication network as recited in claim 1 wherein said common telecommunication network is a publicly switched telecommunication network.

4. The method for routing a special number call to an appropriate special number answering position using a common telecommunication network as recited in claim 1 wherein said extant special number call is an extant emergency service call.

5. The method for routing a special number call to an appropriate special number answering position using a common telecommunication network as recited in claim 1 wherein said appropriate special number answering position is a public service answering point assigned for serving the locus of origin of said extant special number call.

6. The method for routing a special number call to an appropriate special number answering position using a common telecommunication network as recited in claim 3 wherein said extant special number call is an extant emergency service call.

7. The method for routing a special number call to an appropriate special number answering position using a common telecommunication network as recited in claim 6 wherein said appropriate special number answering position is a public service answering point assigned for serving the locus of origin of said extant emergency service call.

8. A system for routing a special number call to an appropriate special number answering position using a common telecommunication network; a switching center being coupled with said common telecommunication network and configured for receiving an extant said special number call; the system comprising:
   (a) a routing determining unit coupled with said switching center for determining location of origin of said extant special number call; said routing determining unit ascertaining an appropriate said special number answering position based on said location of origin of said extant special number call; and
   (b) a gateway switch unit coupled with said routing determining unit, coupled with said common telecommunication network and coupled with said appropriate special number answering position;
said switching center conveying said extant said special number call to said routing determining unit; said routing determining unit providing call-related information to said gateway switch unit for routing said extant special number call to said appropriate special number answering position; said gateway switch unit identifying a temporary call number, associating said temporary call number with said call-related information and providing said temporary call number to said switching center via said routing determining unit; said switching center employing said temporary call number as a called party number for routing said extant special number call through said common telecommunication network to said gateway switch; said gateway switch employing said call-related information associated with said temporary call number for routing said extant special number call to said appropriate special number answering position.

9. The system for routing a special number call to an appropriate special number answering position using a common telecommunication network as recited in claim 8 wherein said gateway switch unit establishes a time interval during which said temporary call number can be employed.

10. The system for routing a special number call to an appropriate special number answering position using a common telecommunication network as recited in claim 8 wherein said common telecommunication network is a publicly switched telecommunication network.

11. The system for routing a special number call to an appropriate special number answering position using a common telecommunication network as recited in claim 8 wherein said extant special number call is an extant emergency service call.

12. The system for routing a special number call to an appropriate special number answering position using a common telecommunication network as recited in claim 8 wherein said appropriate special number answering position is a public service answering point assigned for serving the locus of origin of said extant special number call.

13. The system for routing a special number call to an appropriate special number answering position using a common telecommunication network as recited in claim 10 wherein said extant special number call is an extant emergency service call.

14. The system for routing a special number call to an appropriate special number answering position using a common telecommunication network as recited in claim 13 wherein said appropriate special number answering position is a public service answering point assigned for serving the locus of origin of said extant emergency service call.

15. A method for routing an emergency service call to an appropriate public service answering point using a common telecommunication network; said special number call being received at a switching center coupled with said common telecommunication network; the method comprising:
   (a) ascertaining said appropriate public service answering point for receiving said extant emergency service call;
   (b) providing to a gateway switch call-related information for routing said extant emergency service call to said appropriate public service answering point;
   (c) in no particular order:
      (1) associating said call-related information with a temporary emergency call number at said gateway switch; and
      (2) providing said temporary emergency call number to said switching center;
   (d) employing said temporary emergency call number as a called party number for routing said extant emergency service call through said common telecommunication network to said gateway switch; and
   (e) operating said gateway switch to employ said call-related information associated with said temporary emergency call number for routing said extant emergency service call to said appropriate public service answering point.

16. The method for routing an emergency service call to an appropriate public service answering point using a common telecommunication network as recited in claim 15 wherein step (d) further includes, in no particular order, establishing a time interval during which said temporary emergency call number can be employed.

17. The method for routing an emergency service call to an appropriate public service answering point using a common telecommunication network as recited in claim 15 wherein said common telecommunication network is a publicly switched telecommunication network.

18. The method for routing an emergency service call to an appropriate public service answering point using a common telecommunication network as recited in claim 15 wherein said extant emergency service call is a wireless call.

19. The method for routing an emergency service call to an appropriate public service answering point using a common telecommunication network as recited in claim 17 wherein said extant emergency service call is a wireless call.

20. The method for routing an emergency service call to an appropriate public service answering point using a common telecommunication network as recited in claim 19 wherein said appropriate special number answering position is a public service answering point assigned for serving the locus of origin of said extant special number call.

* * * * *